(12) United States Patent
Fanfa et al.

(10) Patent No.: US 7,887,222 B2
(45) Date of Patent: Feb. 15, 2011

(54) DISPLAY DEVICE WITH CHANGEABLE DISPLAY BACKGROUND

(75) Inventors: Marcelo R Fanfa, Farmington Hills, MI (US); Dimitri Baudon, White Lake, MI (US)

(73) Assignee: Yazaki North America, Inc., Canton, MI (US)

( * ) Notice: Subject to any disclaimer, the term of this patent is extended or adjusted under 35 U.S.C. 154(b) by 330 days.

(21) Appl. No.: 12/117,774

(22) Filed: May 9, 2008

(65) Prior Publication Data

US 2009/0277375 A1 Nov. 12, 2009

(51) Int. Cl.
*B60Q 1/00* (2006.01)

(52) U.S. Cl. ............................ 362/489; 362/23; 362/27; 362/29; 362/28; 362/30; 116/288; 116/250; 116/48; 116/49; 116/310

(58) Field of Classification Search ................. 362/489, 362/23, 27, 28, 29, 30; 116/288, 48, 49, 116/54, 250, 251, 253, 256, 257, 263, 286, 116/310
See application file for complete search history.

(56) References Cited

U.S. PATENT DOCUMENTS

| 2,132,051 | A |   | 10/1938 | Shuttenberg |
|---|---|---|---|---|
| 2,528,640 | A |   | 11/1950 | Coleman |
| 2,635,357 | A |   | 4/1953 | Whitlock |
| 4,660,992 | A | * | 4/1987 | Paul et al. .................... 368/223 |
| 5,572,239 | A |   | 11/1996 | Jaeger |
| 5,787,055 | A |   | 7/1998 | Alpert |
| 5,841,428 | A |   | 11/1998 | Jaeger et al. |
| 5,859,631 | A |   | 1/1999 | Bergman et al. |
| 5,936,613 | A |   | 8/1999 | Jaeger et al. |
| 5,982,352 | A |   | 11/1999 | Pryor |
| 6,219,035 | B1 |   | 4/2001 | Skog |
| 6,729,738 | B2 | * | 5/2004 | Fuwausa et al. ............... 362/84 |
| 7,084,859 | B1 |   | 8/2006 | Pryor |
| 2006/0101685 | A1 |   | 5/2006 | Smith, III et al. |
| 2006/0268535 | A1 | * | 11/2006 | Kraus .......................... 362/23 |
| 2007/0124972 | A1 |   | 6/2007 | Ratcliffe |

* cited by examiner

*Primary Examiner*—Sandra L O Shea
*Assistant Examiner*—Jessica L McMillan
(74) *Attorney, Agent, or Firm*—Harness, Dickey & Pierce, P.L.C.

(57) ABSTRACT

A vehicle display with a housing having a gauge port, an interior wall around the gauge port, and an appliqué port extending from an exterior side of the vehicle display and intersecting the gauge port. A light source provides light into the gauge port and directs the light outwardly from a front side of the housing. An appliqué has a first locking feature. The appliqué port at least partially receives the appliqué between the front side of the housing and the light source. The light from the light source illuminates a portion of the appliqué. The first locking features releasably engages a second locking feature.

20 Claims, 8 Drawing Sheets

DISPLAY DEVICE WITH CHANGEABLE DISPLAY BACKGROUND

FIELD

The present disclosure relates to vehicle display systems and more particularly to an indicator display gauge having a slot for receiving a customized background.

BACKGROUND

The statements in this section merely provide background information related to the present disclosure and may not constitute prior art.

Motor vehicles typically employ a plurality of gauges on an instrument panel or dashboard for displaying information regarding operating parameters of the vehicle. These gauges may indicate values corresponding to vehicle speed, engine coolant temperature, engine oil temperature, fuel level, oil pressure, battery voltage and the like. The gauges may employ either a digital or an analog readout for relaying the indicated values to an operator. The digital readout provides the operator with the current numeric values corresponding to the measured operating parameter, while the analog readout displays all potential measured operating parameters with interpretation left to the operator.

In particular, analog gauges include an appliqué sealingly inserted within the gauge having indicia thereon. The appliqué may be mounted in a spaced apart relationship or adhered to a faceplate. An indicating instrument, also mounted within the gauge, rotates or traverses the faceplate while pointing to the indicia. Vehicle manufacturers calibrate the position of the appliqué so that the indicating instrument points to the current numeric value corresponding to the measured operating parameter. By mounting the appliqué and indicating instrument within the gauge, the likelihood of incorrect gauge calibration is thereby reduced. However, vehicle manufacturers must choose features such as the color of the appliqué and font of the indicia in advance of assembly. Typically, the colors and fonts are a standard and neutral design acceptable for most operators.

SUMMARY

In one form, the teachings of the present disclosure provide a vehicle display that has a housing defining a gauge port, an interior wall about the gauge port, and an appliqué port extending from an exterior side of the vehicle display and intersecting the gauge port. A light source provides light into the gauge port and directs the light outwardly from a front side of the housing. An appliqué, having a first locking feature, is at least partially received into the appliqué port between the front side of the housing and the light source such that the light from the light source illuminates a portion of the appliqué. The first locking member releasably engages a second locking member.

In another form, the teachings of the present disclosure provide a vehicle display that has a housing with a plurality of indicator apertures and a plurality of appliqué ports. Each of the appliqué ports intersects an associated one of the indicator apertures and an exterior side of the vehicle display. The plurality of appliqué ports receive a corresponding plurality of appliqués to form an appliqué/port pair with the corresponding one of the appliqué ports. A plurality of light sources associate with one of the appliqué ports and direct the light outwardly from a front side of the housing. An identification means generates an identification signal for each of the appliqué/port pairs. Each identification signal identifies at least one characteristic of the appliqué of the appliqué/port pair and a location of the appliqué port. A controller coupled to the plurality of light sources operates the light sources to illuminate based at least partially on the identification signal for each of the appliqué/port pairs.

In yet another form, the teachings of the present disclosure provide a vehicle instrument display gauge that has a gauge housing. The gauge housing includes a transparent faceplate, an appliqué port, and a telltale position grid. The transparent faceplate and the appliqué port are located on an external surface of the gauge housing. The telltale position grid, having a plurality of light sources, is located within the housing and is visible through the faceplate. Additionally, the appliqué port receives an appliqué member having indicia, which are lit by the plurality of light sources in the indicia position grid.

In still another form, the teachings of the present disclosure provide a method that includes: providing a vehicle gauge with a housing having a plurality of gauge ports, each of the gauge ports associated with a light; selecting an appliqué from a plurality of appliqués; inserting the selected appliqué into a first slot formed in the exterior of the vehicle gauge and in-line with a first one of the gauge ports; controlling the lights according to a first schedule, which is at least partially determined by a location of the first slot in which the selected appliqué is inserted; removing the selected appliqué from the first slot and inserted into a second slot formed in the exterior of the vehicle gauge and in-line with a second one of the gauge ports, the second slot being different from the first slot; and controlling the lights according to a second schedule, the second schedule being at least partially determined by a location of the second slot in which the second appliqué is inserted.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
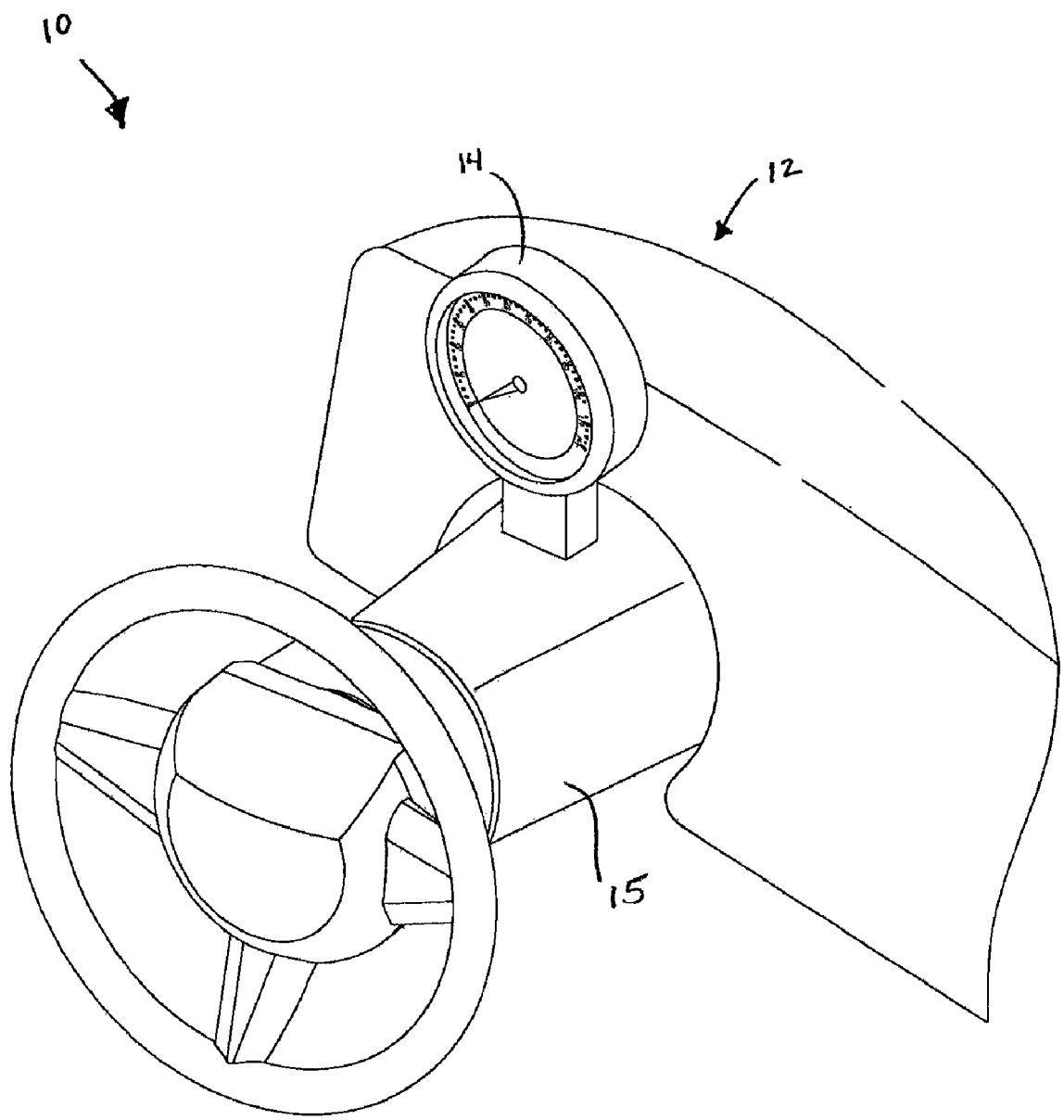
FIG. 1 is a perspective view of an exemplary vehicle interior having a display system including a display gauge according to the present disclosure.

With reference to FIG. 1 of the drawings, a vehicle constructed in accordance with the teachings of the present disclosure is generally indicated at reference numeral 10. The vehicle 10 can include a display system 12 that can include a display gauge 14 that is mounted to or on a steering wheel column 15 or a dashboard. The display gauge 14 can be configured to display one or more types of vehicle information, such as the speed of the vehicle 10, a temperature of an engine coolant or lubricant, a pressure of an engine lubricant, a battery charging voltage, a fuel level and/or vehicle status information. The vehicle status information can include an indication of whether a vehicle feature (e.g., high beam lights, cruise control, traction control, four-wheel drive) has been activated and/or whether a vehicle fault (e.g., low fuel, low engine lubricant pressure, high engine lubricant or coolant temperature, a sensor malfunction) has occurred.

Figure 2:
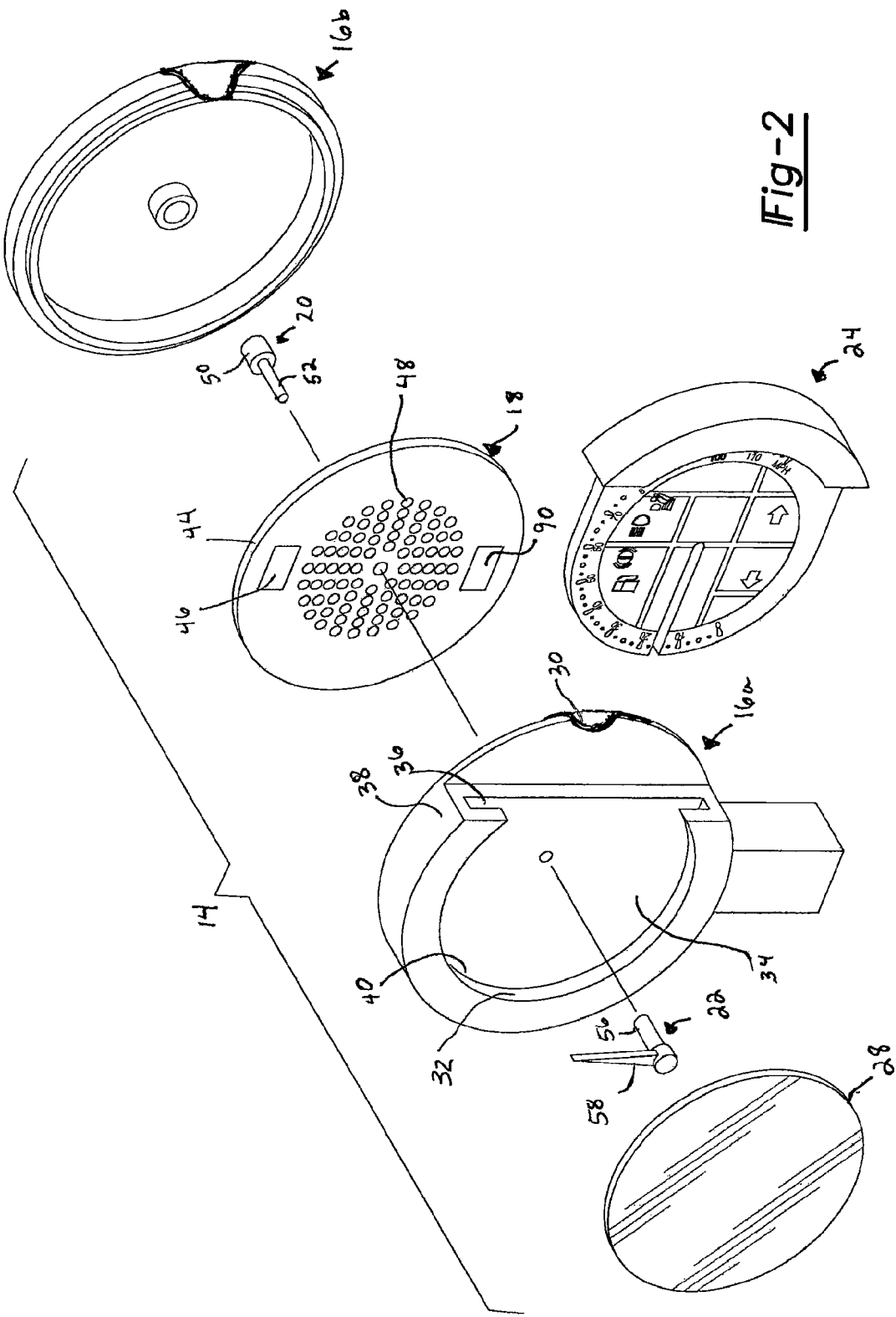
FIG. 2 is an exploded perspective view of the display gauge according to the present disclosure.

With additional reference to FIG. 2, the display gauge 14 can include a housing assembly 16 (front housing 16a and rear housing 16b), a circuit board assembly 18, a motor assembly 20, a pointer 22 and an appliqué 24. The housing assembly 16 can include a lens or faceplate 28 and a first locking member 30. The front housing 16a can include an interior wall 32, which can extend about a gauge port 34, and an appliqué port 36. The appliqué port 36 can extend through an exterior side 38 of the display gauge 14 and intersect the gauge port 34. The front housing 16a could include further structure, such as one or more conventional reflectors 40 and/or one or more conventional light guides (not shown) that can be spaced apart (e.g., rearwardly) from the appliqué port 36. The faceplate 28 can be formed of a transparent material, such as clear polycarbonate, and can cover a portion of the housing assembly 16 that includes the gauge port 34.

The circuit board assembly 18 can include a board member 44, which can abut the rear housing 16b, a controller 46 and a light source 48, such as a plurality of light emitting diodes (LEDs), that can be mounted on the board member 44. The board member 44 can be configured such that the light source 48 is disposed within the gauge port 34 and positioned so that a portion of the light that is produced may be transmitted in a direction that extends outwardly through the faceplate 28. The controller 46 can be coupled to various other vehicle systems and can control the light source 48 to selectively illuminate all or portions of the appliqué 24.

The motor assembly 20 can include a motor 50, which can be a stepper motor, a DC motor with a position sensor (e.g., an absolute position sensor) or an ultrasonic motor, and an output member 52 that can be driven by the motor 50. In the example provided, the output member 52 is a shaft that is coupled for rotation with the rotor (not specifically shown) of the motor 50.

The pointer 22 can include a stem 56, which can be fixedly coupled to the output member 52 of the motor assembly 20, and a pointer member 58 that can extend radially outwardly from the stem 56. The pointer member 58 can be rotatably disposed in the gauge port 34 forwardly of the appliqué port 36.

Figure 3:
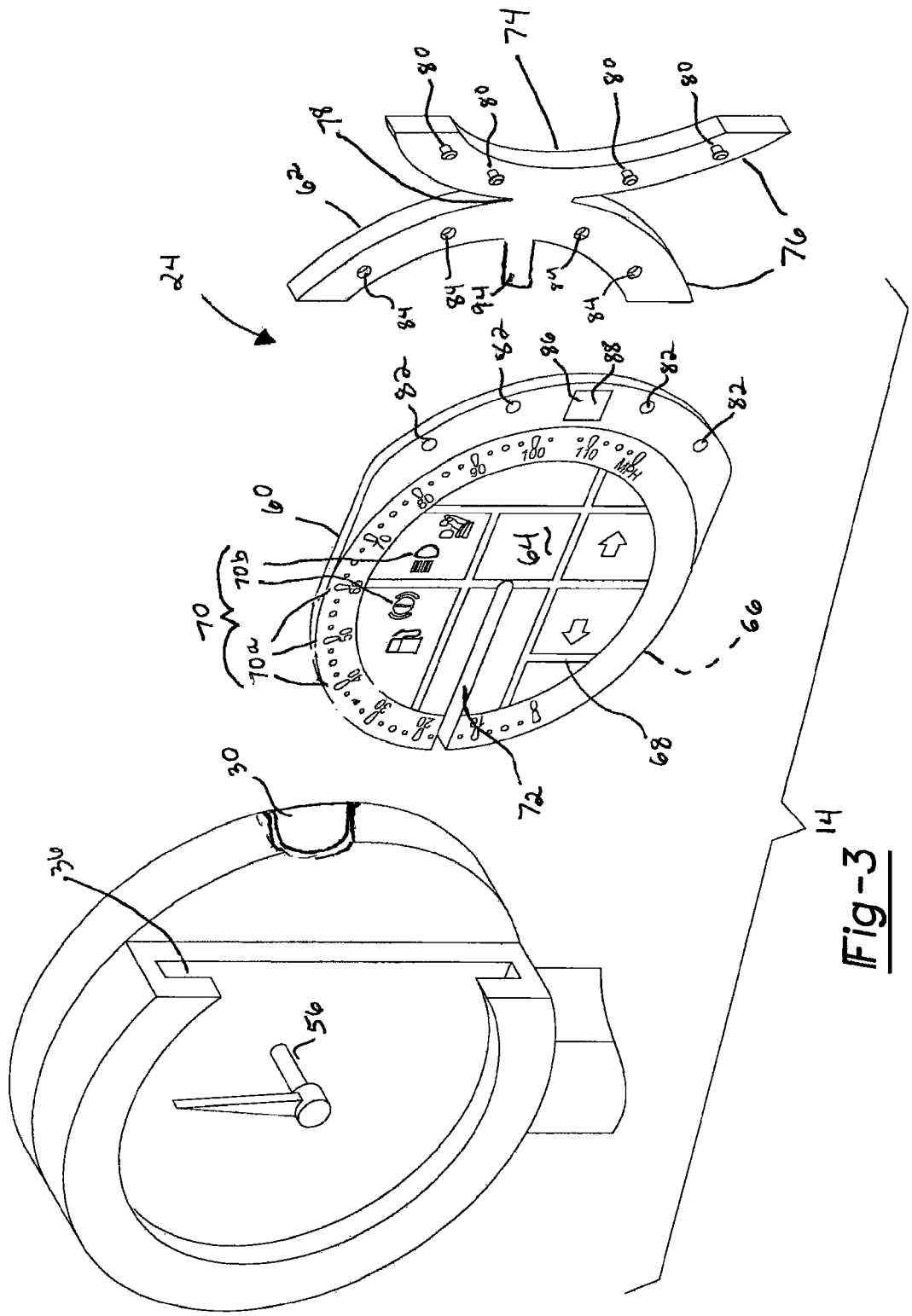
FIG. 3 is an exploded perspective view of an appliqué of the display system according to the present disclosure.
Figure 4:
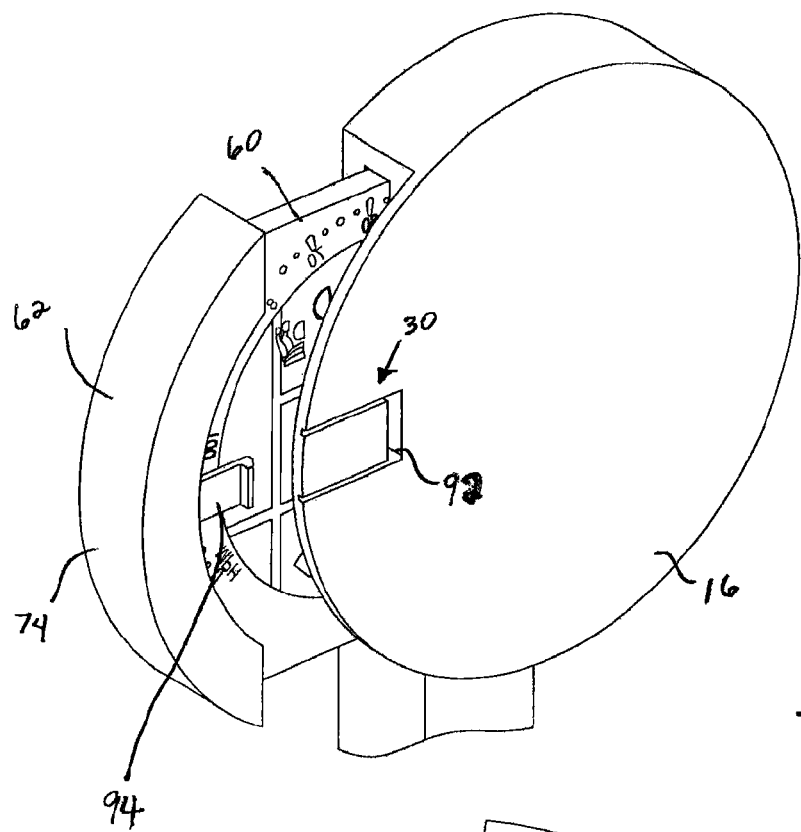
FIG. 4 is a perspective view of the display system of FIG. 1 illustrating the appliqué prior to complete insertion in the display gauge.
Figure 5:
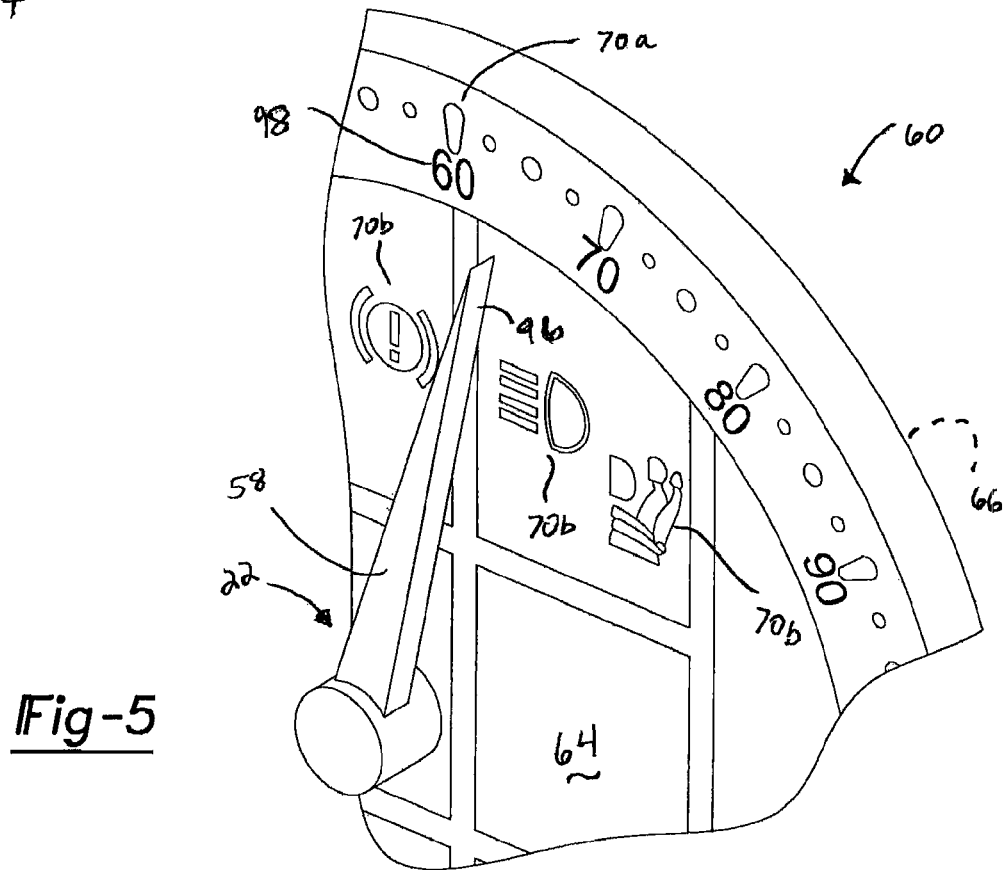
FIG. 5 is a front view of a portion of the appliqué of FIG. 3.

Referring now to FIGS. 3-5, the appliqué 24 can be sized to be received in the appliqué port 36 and can include an appliqué member 60 and a second locking member 62. The appliqué member 60 can have a front face 64 and a rear face 66. The appliqué member 60 can include a decorative background 68 and one or more sets of indicia 70. The decorative background 68 can include any combination of transparent, translucent and/or opaque materials, such as inks, dyes, and foils, and can form a desired image or pattern. The decorative background 68 can contain a display graphic, such as seasonal art, licensed art, or customer-personalized art (e.g. photographs or graphic art). The decorative background 68 may be cropped or bordered by an element (e.g., a black line) in locations proximate the indicia 70. The set or sets of indicia 70, if included, can include any combination of transparent, translucent and/or opaque materials that can be configured to communicate the vehicle information to a vehicle operator. In this regard, each set of indicia 70 can be formed of numbers, text, symbols and combinations thereof. In instances where the appliqué 24 employed in the display gauge 14 utilizes the stem 56, a slot 72 can be formed into the appliqué member 60 to accommodate the stem 56 of the pointer 22 and/or the output member 52 of the motor assembly 20, as will be discussed in more detail below. In the particular example provided, the display gauge 14 is a multi-function display gauge and the appliqué member 60 includes a first set of indicia 70a, which consists of a plurality of numerals, and a second set of indicia 70b that consists of a plurality of symbols.

The second locking member 62 can be coupled to the appliqué member 60 in any desired manner and can define a grip portion 74. For example, the second locking member 62 can include a pair of arcuate members 76 that can be coupled to one another via a living hinge 78. One of the arcuate members 76 can include a plurality of posts 80 that can be received through corresponding holes 82 in the appliqué member 60 and corresponding post holes 84 formed in the second one of the arcuate members 76. The posts 80 can lockingly engage (permanently or releasably) the post holes 84 to couple the second locking member 62 to the appliqué member 60. Alternatively, the arcuate members 76 could be welded or bonded to one another and/or to the appliqué member 60. The second locking member 62 cooperate with the first locking member 30 to releasably secure the appliqué 24 to the housing assembly 16 when the appliqué 24 is inserted to the gauge port 34. The first and second locking members 30, 62 ensure proper alignment of the appliqué 24 within the housing assembly 16 in order to achieve accurate readings of the display gauge 14.

The appliqué 24 can include an identification means 86 that can permit the controller 46 to control the illumination of the light source 48 in a manner that corresponds to the particular appliqué 24 that is inserted into the appliqué port 36. In the particular example provided, the appliqué 24 includes an RFID (radio frequency identification) tag 88, while the housing assembly 16 further includes an RFID receiver 90 (FIG. 2) for reading information from the RFID tag 88 and transmitting this information to the controller 46. The RFID tag 88 can be coupled to the appliqué 24 in any convenient manner, such as between the arcuate members 76 of the second locking member 62. The RFID tag 88 can be programmed with information that concerns the manner in which the light source 48 is to be controlled. For example, the programmed information may include information on how the light source 48 (e.g., individual or particular groups of LEDs) is to be controlled. In one form, the light source 48 can be controlled in an "on" state (e.g., producing light) or an "off" state. It will be appreciated, however, that the light source 48 can be controlled so as to provide light intensity that can be varied between an "off" state and a fully "on" state in which the light source 48 is providing light at a maximum intensity level. Examples of the information that may be programmed into the RFID tag 88 include:

(a) Identification of an illumination scheme for the entire appliqué 24, as when portions of the appliqué 24 need not be illuminated (e.g., in an area that includes an opaque background) or when a particular color light is to be used;

(b) Identification of the location of particular indicia 70 on the appliqué 24, such as the location of various telltale indicators (e.g., to permit the vehicle information to be displayed in a different area or a differently sized area); and (c) Identification of the type of indicia 70 on the appliqué 24 to be illuminated, such as the identification of the specific telltale indicators included on the appliqué 24 (e.g., to permit the vehicle information to be addressed to a particular display gauge 14).

Where the programmed information identifies the type of indicia 70 on the appliqué 24, it will be appreciated that such information may also be employed as necessary to control the motor assembly 20. Configuration in this manner permits, for example, the swapping of the location of engine tachometer and vehicle speedometer gauges.

As shown in FIG. 4, the first locking member 30 includes an aperture 92 that can be formed in the housing assembly 16, while the second locking member 62 includes a resilient locking tab or hook 94. Those of skill in the art will appreciate that the first and second locking members 30, 62 could include any type of locking device and that such locking devices can employ any means for resisting the removal of the appliqué 24 from the appliqué port 36 once installed thereto. For example, the first and second locking members 30, 62 could include a resilient detent (not shown) that can be selectively received into a recess (not shown), or could employ threaded fasteners and/or an interference fit between a portion of the housing assembly 16 and the second locking member 62.

The grip portion 74 can be a hard material for structure (e.g. polymer) overmolded with a soft material for grip (e.g. elastomer). It should also be understood that the appliqué member 60 and the grip portion 74 can be molded as a single unit.

In operation, as shown in FIG. 5, the pointer 22 can be driven by the motor assembly 20 about the gauge port 34 to position a distal end 96 of the pointer member 58 to an indicia member 98 of the first set of indicia 70a so as to display a speed of the vehicle 10. Elements of the second set of indicia 70b can be selectively illuminated to display other types of vehicle information. In the particular example provided, the second set of indicia 70b includes a plurality of telltale indicators including, but not limited to, left and right turn signal indicators, a cruise control indicator, a high beam indicator, an air bag indicator, an anti-lock brake system indicator and a general fault indicator. The first and second sets of indicia 70a and 70b can be illuminated by respective portions of the light source 48 (e.g., discrete sets of LEDs) and can be illuminated from the front face 64 or from the rear face 66 of the appliqué member 60. In the particular example provided, the first and second sets of indicia 70a, 70b are illuminated from the rear face 66 of the appliqué member 60.

The grip portion 74 design allows for at least partial cover of the appliqué port 36, which assists in preventing debris from entering the display gauge 14. Additionally, the grip portion 74 can be used to protect the RFID tag 88 from external elements. However, in the case where the grip portion 74 and appliqué member 60 are molded as a single unit, alternate means for identifying the location of the indicia 70 may be necessary (rather than the standard RFID tag 88). For example, the appliqué member 60 may include specific configurations of contact ribs indicating the placement of the indicia 70. The display gauge 14 may also incorporate light coding for determination of the location of the indicia 70.

Figure 6:
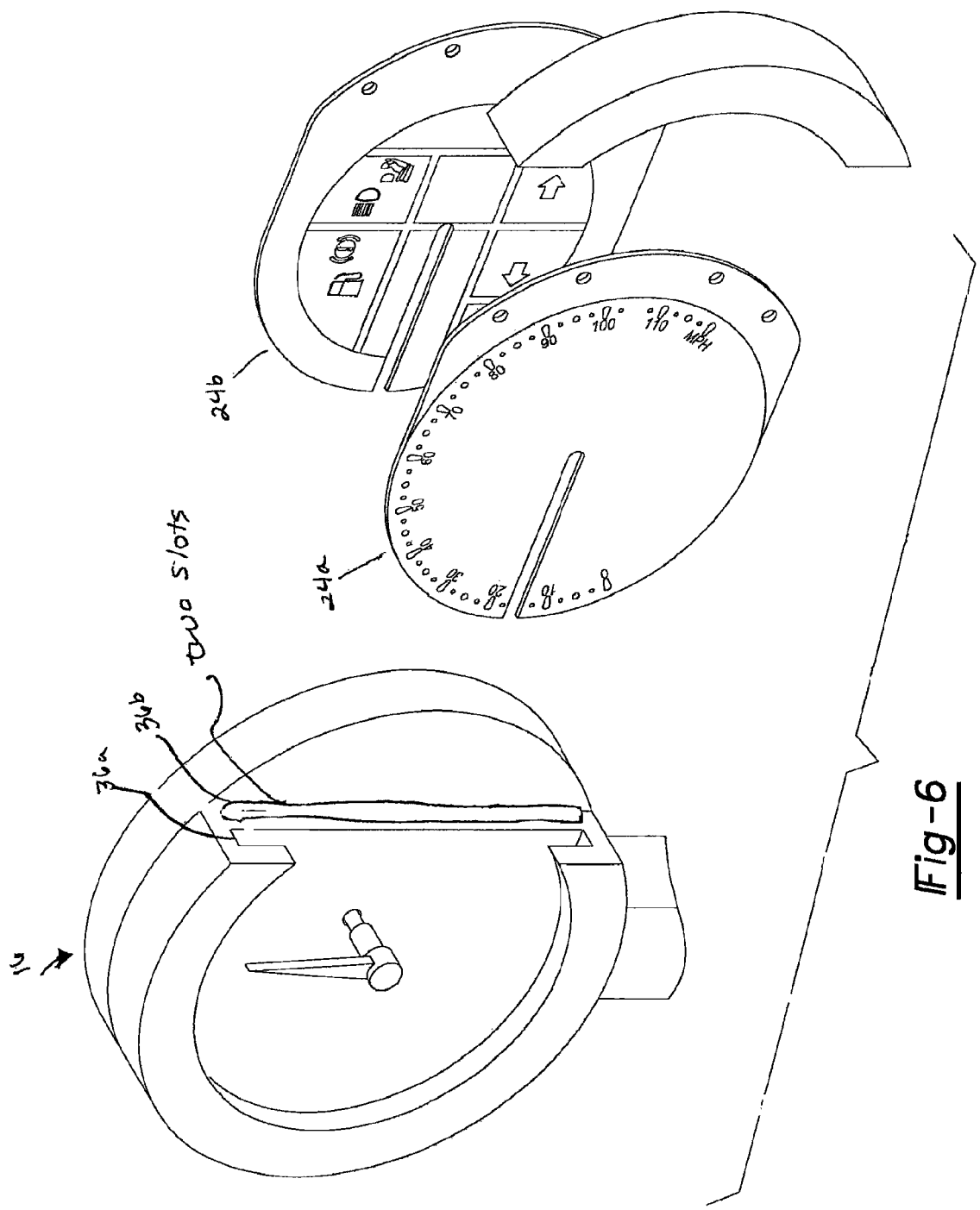
FIG. 6 is a perspective view of an alternate embodiment of the display system of FIG. 1 illustrating the display gauge having multiple appliqués.

Although the display gauge 14 is depicted having the single appliqué 24, it is also contemplated that multiple appliqués 24a, 24b may be used to create a three-dimensional effect where each appliqué 24 is in a spaced apart relationship with the other appliqués 24 as shown in FIG. 6. In such a case, one or more appliqué ports 36a, 36b can be incorporated in the housing assembly 16.

Figure 7:
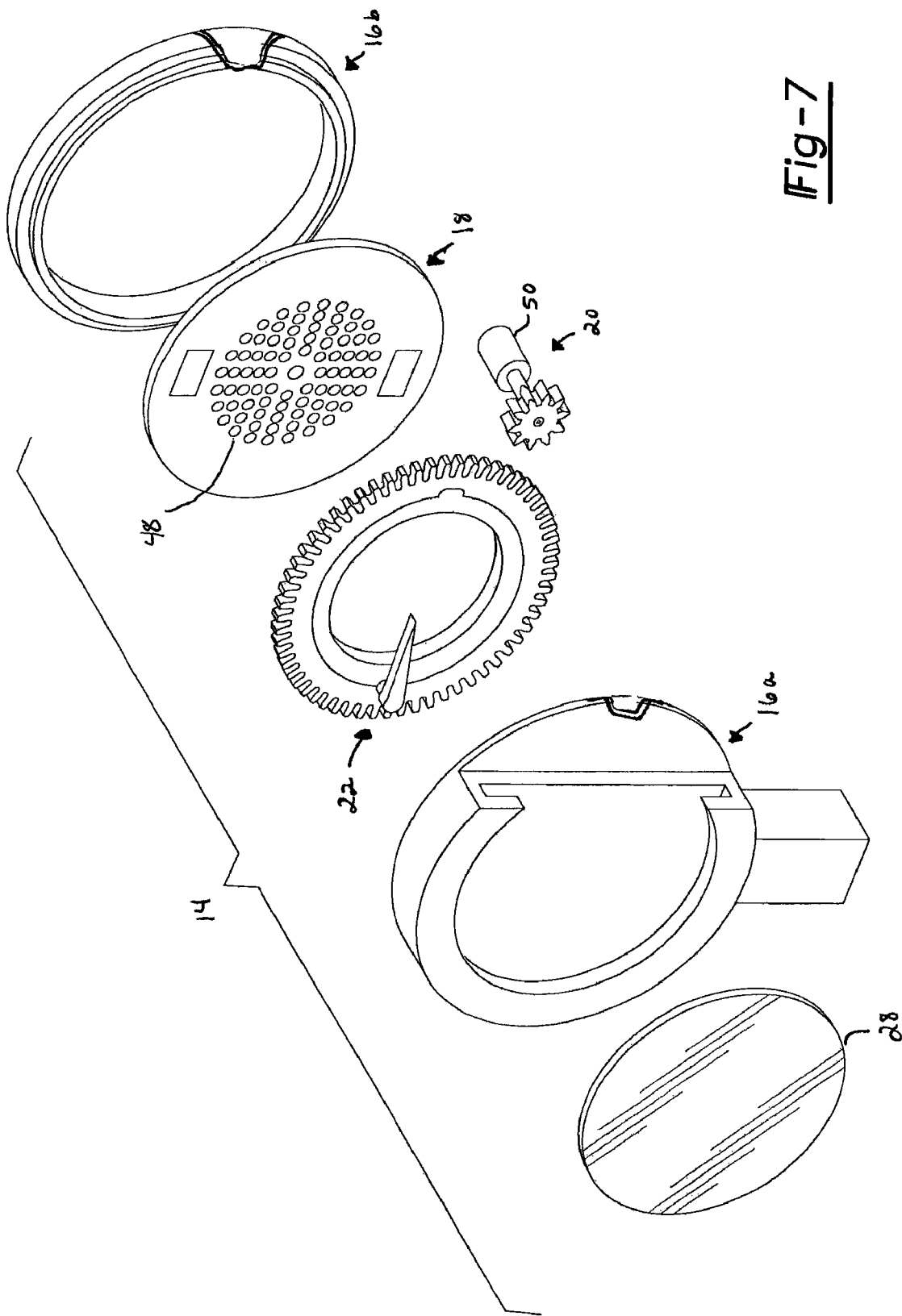
FIG. 7 is an exploded perspective view similar to that of FIG. 2 including a shaftless pointer.

Those of skill in the art will also appreciate from this disclosure that while the display gauge 14 has been illustrated and described as including pointer 22 and motor assembly 20 extending through slot 72 in the appliqué member 60, the pointer 22 could be driven in a "shaftless" manner as is shown in FIG. 7. In such instance, the display gauge 14 can be generally similar to the display gauge described in U.S. Pat. Ser. No. 11/157,013 entitled "Vehicle Gauge with Embedded Driver Information".

Figure 8:
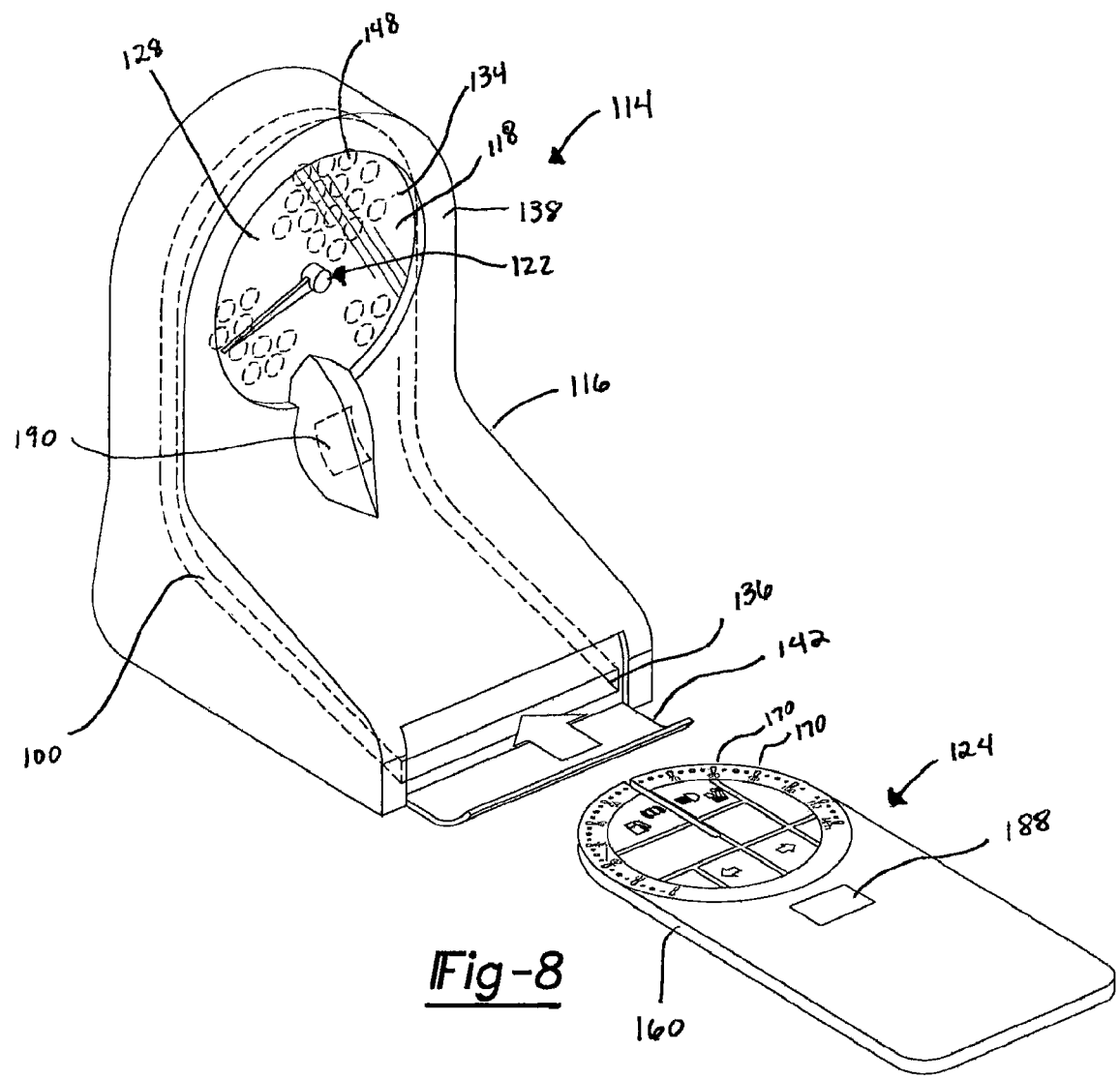
FIG. 8 is a perspective view of an alternate embodiment of the display system of FIG. 1.

Referring now to FIG. 8, an alternate display gauge 114 is shown including an appliqué 124 and a housing assembly 116. In view of the substantial similarity in structure and function of the components associated with the display gauge 14 with respect to the display gauge 114, like reference numerals are used hereinafter to identify the like components.

The housing assembly 116 has an internal gauge port 134 containing a pointer 122, an RFID receiver 190, and an appliqué port cover 142. A faceplate 128 on an exterior surface 138 of the housing assembly 116 allows for viewing the gauge port 134 and the appliqué 124. A circuit board assembly 118 incorporates a light source 148, which functions as previously described.

The appliqué 124 includes an RFID tag 188 and an appliqué member 160. The appliqué member 160 is sized for insertion in the housing assembly 116 through an appliqué port 136. A flexible material for the appliqué member 160 is necessary to allow for bending along a curved path 100 for entering the gauge port 134. The appliqué member 160 may also have a slot 172 for insertion around the pointer 122 when a shafted-design is used. After insertion through the appliqué port 136, the operator closes the appliqué port cover 142 to lock the appliqué 124 within the housing assembly 116. As in the previous embodiment, the display gauge 114 provides the operator with feedback regarding current vehicle parameters using indicia 170.

Figure 9A:
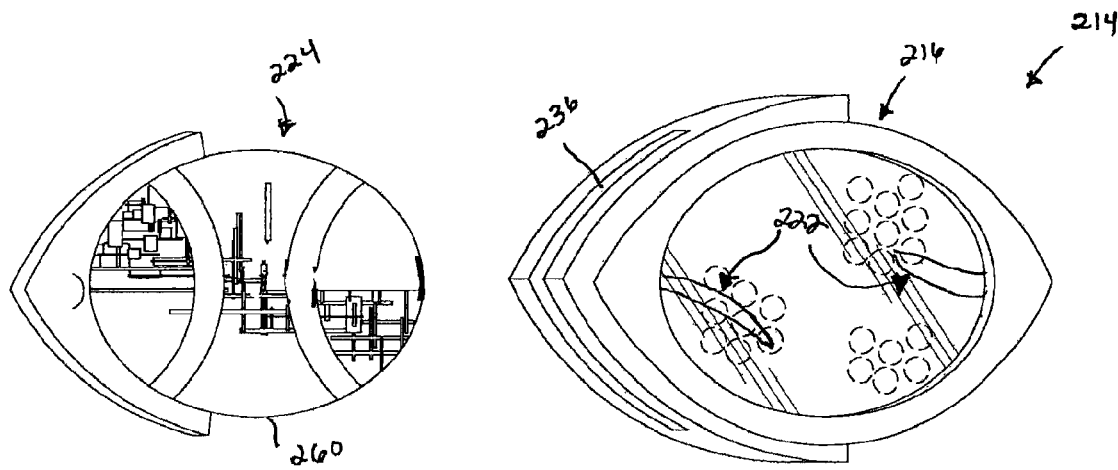
FIG. 9a is a front view of another alternate embodiment of the display system of FIG. 1.
Figure 9B:
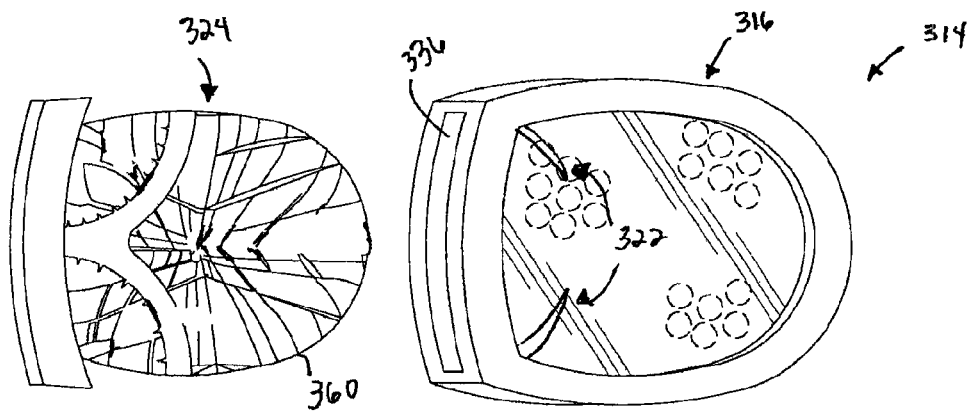
FIG. 9b is a front view of another alternate embodiment of the display system of FIG. 1.
Figure 9C:
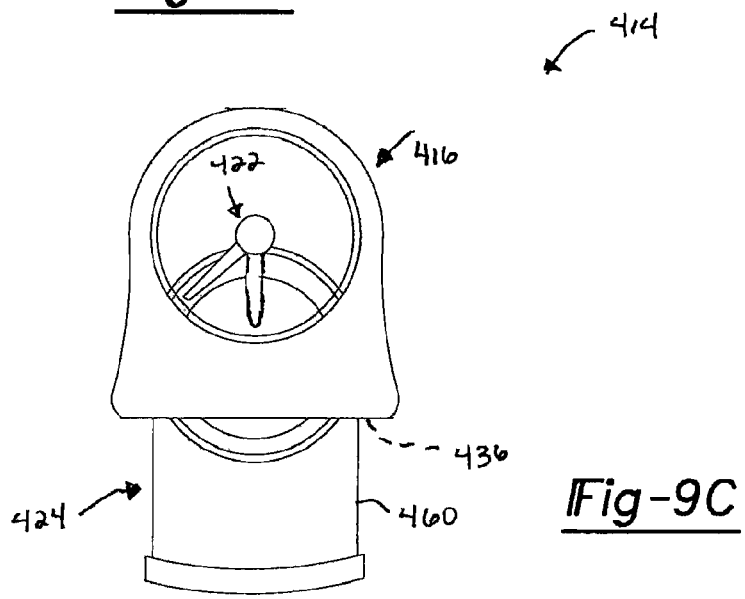
FIG. 9c is a front view of another alternate embodiment of the display system of FIG. 1.

Referring now to FIGS. 9a, 9b, and 9c, alternate display gauge 214, 314, 414 configurations, respectively, are shown. It is important to note that in each embodiment, a housing assembly 216, 316, 416 has an appliqué port 236, 336, 436 through which an appliqué 224, 324, 424 is inserted. The size, shape and location of the appliqué port 236, 336, 436 may vary by embodiment. However, irregular shaped appliqué members 260, 360, 460 and additional pointers 222, 322, 422 are contemplated.

A method for personalizing the display gauge 14 is also provided. The method involves:

providing a vehicle gauge with a housing having a plurality of gauge ports, each of the gauge ports being associated with a light;

selecting an appliqué from a plurality of appliqués;

inserting the selected appliqué into a first slot formed in the exterior of the vehicle gauge and in-line with a first one of the gauge ports;

controlling the lights according to a first schedule, the first schedule being at least partially determined by a location of the first slot in which the selected appliqué is inserted;

removing the selected appliqué from the first slot;

inserting the selected appliqué into a second slot formed in the exterior of the vehicle gauge and in-line with a second one of the gauge ports, the second slot being different from the first slot; and controlling the lights according to a second schedule, the second schedule being at least partially determined by a location of the second slot in which the second appliqué is inserted.

While the invention has been described in the specification and illustrated in the drawings with reference to various embodiments, it will be understood by those of ordinary skill in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A vehicle display comprising:
   a housing defining a gauge port, an interior wall that is disposed about the gauge port, and an appliqué port that extends from an exterior side of the vehicle display and intersects the gauge port;
   a light source providing light into the gauge port, the light source being configured to direct the light outwardly from a front side of the housing; and
   an appliqué having a first locking feature, the appliqué being at least partially received into the appliqué port between the front side of the housing and the light source such that the light from the light source illuminates a portion of the appliqué;
   wherein the housing includes a second locking feature that is lockingly engaged by the first locking feature during insertion of the appliqué into the appliqué port and wherein engagement of the first locking feature to the second locking feature inhibits withdrawal of the appliqué from the appliqué port.

2. The vehicle display of claim 1, further comprising an analog gauge received in the gauge port, at least a portion of the analog gauge being visible when the appliqué is received in the appliqué port and the first and second locking features are engaged to one another.

3. The vehicle display of claim 2, wherein the analog gauge includes a rotary output member and a pointer that is coupled to the rotary output member for movement therewith.

4. The vehicle display of claim 3, wherein a groove is formed into the appliqué, the groove extending inwardly from an exterior edge of the appliqué, the pointer, the rotary output member or both the pointer and the rotary output member being positioned in the groove when the appliqué is received in the appliqué port and the first and second locking features are engaged to one another.

5. The vehicle display of claim 3, further comprising gauge indicia that are coupled to the housing and which are separate from the appliqué.

6. The vehicle display of claim 1, further comprising a display received in the gauge port, the display being visible through a portion of the appliqué when the appliqué is received in the appliqué port and the first and second locking features are engaged to one another.

7. A vehicle display comprising:
   a housing defining a plurality of indicator apertures and a plurality of appliqué ports, each of the appliqué ports intersecting an associated one of the indicator apertures and an exterior side of the vehicle display;
   a plurality of appliqués, each of the appliqués being received in a corresponding one of the appliqué ports to thereby form an appliqué/port pair with a corresponding one of the appliqué ports;
   a plurality of light sources, each of the light sources being associated with one of the appliqué ports and configured to direct the light outwardly from a front side of the housing;
   identification means for generating an identification signal for each of the appliqué/port pairs, each identification signal identifying at least one characteristic of the appliqué of the appliqué/port pair and a location of the appliqué port; and
   a controller coupled to the plurality of light sources and operating the light sources to illuminate based at least partially on the identification signal for each of the appliqué/port pairs.

8. A vehicle display comprising:
   a gauge housing having a transparent faceplate and defining an appliqué port, the transparent faceplate and the appliqué port being positioned on an external surface of the gauge housing;
   a telltale position grid having a plurality of light sources, the telltale position grid disposed within the housing and externally visible through the transparent faceplate; and
   an appliqué member sized for insertion into the gauge housing through the appliqué port, the appliqué member having indicia for selectable lighting by the plurality of light sources;
   wherein the appliqué port extends along a curved path between an opening in the housing and the telltale position grid and wherein the appliqué member is formed of a flexible material that permits the appliqué member to bend as it is inserted into the appliqué port.

9. The vehicle display of claim 8, further comprising:
   a first locking feature on the gauge housing; and
   a second locking feature on the appliqué member, the first locking feature receivably engaging the second locking feature.

10. The vehicle display of claim 8, further comprising:
    an identification device on the appliqué member; and
    a receiving device on the gauge housing, the identification device communicating with the receiving device to provide identification information of the appliqué member.

11. The vehicle display of claim 10, wherein the identification information includes at least one of scale, indicia location, telltale location, step motor speed, pointer range, and overall brightness and color for the light sources.

12. The vehicle display of claim 10, wherein the identification device is a radio frequency identification tag.

13. The vehicle display of claim 8, wherein the plurality of light sources are light emitting diodes.

14. The vehicle display of claim 8, wherein the appliqué member further comprises: a locking grip, the locking grip including a first locking feature for removable attachment to a second locking feature on the gauge housing.

15. The vehicle display of claim 14, wherein the locking grip is a combination of a hard material for structure and a soft material for grip.

16. The vehicle display of claim 15, wherein the hard material is a polymer.

17. The vehicle display of claim 15, wherein the soft material is an elastomer.

18. A method comprising:
   providing a vehicle gauge with a housing having a plurality of gauge ports, each of the gauge ports being associated with a light;
   selecting an appliqué from a plurality of appliqués;
   inserting the selected appliqué into a first slot formed in the exterior of the vehicle gauge and inline with a first one of the gauge ports;
   controlling the lights according to a first schedule, the first schedule being at least partially determined by a location of the first slot in which the selected appliqué is inserted;
   removing the selected appliqué from the first slot;
   inserting the selected appliqué into a second slot formed in the exterior of the vehicle gauge and inline with a second one of the gauge ports, the second slot being different from the first slot; and
   controlling the lights according to a second schedule, the second schedule being at least partially determined by a location of the second slot in which the selected appliqué is inserted.

19. The method of claim 18, further comprising providing the first and second schedules to the vehicle gauge through one of radio frequency identification, contact rib identification, and light coding.

20. The method of claim 18, further comprising locking the selected appliqué in the vehicle gauge to provide calibrated gauge readings.

* * * * *